(12) United States Patent
Ichinokawa

(10) Patent No.: US 10,345,586 B2
(45) Date of Patent: Jul. 9, 2019

(54) HEAD-UP DISPLAY DEVICE

(71) Applicant: HONDA MOTOR CO., LTD., Minato-ku, Tokyo (JP)

(72) Inventor: Jumpei Ichinokawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/927,131

(22) Filed: Mar. 21, 2018

(65) Prior Publication Data

US 2018/0284436 A1 Oct. 4, 2018

(30) Foreign Application Priority Data

Mar. 28, 2017 (JP) ................. 2017-062042

(51) Int. Cl.
| | | |
|---|---|---|
| *G02B 27/01* | (2006.01) | |
| *B60K 35/00* | (2006.01) | |
| *B60K 37/02* | (2006.01) | |

(52) U.S. Cl.
CPC .......... *G02B 27/0101* (2013.01); *B60K 35/00* (2013.01); *B60K 37/02* (2013.01); *B60K 2350/2052* (2013.01); *B60K 2350/922* (2013.01)

(58) Field of Classification Search
CPC .. G02B 27/01; G02B 27/014; G02B 27/0101; G02B 27/0149; G02B 2027/013; G02B 2027/0141; G02B 2027/0154; B60K 2350/40; B60K 2350/1072; B60K 2350/2052; B60K 2350/2065; B60K 35/00
See application file for complete search history.

(56) References Cited

U.S. PATENT DOCUMENTS

| | | | | |
|---|---|---|---|---|
| 4,978,196 A | * | 12/1990 | Suzuki | G02B 27/0101 |
| | | | | 359/630 |
| 10,018,841 B1 | * | 7/2018 | Chen | G02B 27/0101 |
| 2015/0198802 A1 | * | 7/2015 | Ando | G02B 27/0101 |
| | | | | 359/200.8 |
| 2017/0115485 A1 | | 4/2017 | Saito et al. | |
| 2018/0267304 A1 | * | 9/2018 | Sasaki | G02B 27/0101 |

FOREIGN PATENT DOCUMENTS

| | | |
|---|---|---|
| JP | 2008-296635 | 12/2008 |
| JP | 2015-069081 | 4/2015 |
| JP | 2016-014861 | 1/2016 |
| JP | 3209553 | 3/2017 |

OTHER PUBLICATIONS

Japanese Office Action for Japanese Patent Application No. 2017-062042 dated Oct. 16, 2018.

* cited by examiner

*Primary Examiner* — Sultan Chowdhury
(74) *Attorney, Agent, or Firm* — Amin, Turocy & Watson LLP

(57) ABSTRACT

In a head-up display device, projection light P emitted from a projector is reflected by a plurality of reflectors (first reflector, second reflector, third reflector) and then, the projection light P is formed into an image on an image formation unit. Among the projector and the reflectors, the first reflector and the third reflector are housed in a casing. Among the reflectors, the second reflector is disposed at a roof near a windshield of a vehicle.

4 Claims, 4 Drawing Sheets

HEAD-UP DISPLAY DEVICE

CROSS-REFERENCE TO RELATED APPLICATION

This application is based upon and claims the benefit of priority from Japanese Patent Application No. 2017-062042 filed on Mar. 28, 2017, the contents of which are incorporated herein by reference.

BACKGROUND OF THE INVENTION

Field of the Invention

The present invention relates to a head-up display device that projects an image to an image formation unit of a vehicle.

Description of the Related Art

Japanese Laid-Open Patent Publication No. 2008-296635 discloses a head-up display device (hereinafter also referred to as HUD) that achieves size reduction and forms an image (virtual image) at a far position by extending an optical path length. In this device, projection light emitted from a displayer is reflected by a combiner, the projection light reflected by the combiner is reflected by a first reflector, the projection light reflected by the first reflector is reflected by a second reflector, the projection light reflected by the second reflector is guided to the combiner again, and then an image is formed in the combiner.

SUMMARY OF THE INVENTION

The HUD according to Japanese Laid-Open Patent Publication No. 2008-296635 has the long optical path length because the number of times of reflection in the projection unit is increased. However, if the projection unit itself is not large, increasing the number of times of reflection cannot extend the optical path length drastically. On the other hand, increasing the size of the projection unit can extend the optical path length to some extent; however, the vehicle does not include a space for providing a large projection unit.

The present invention has been made in view of the above problem, and an object is to provide a head-up display device that can form a virtual image at a far position.

A head-up display device according to the present invention includes: a projector configured to emit projection light including image information; a plurality of reflectors configured to reflect the projection light emitted from the projector in a predetermined direction; an image formation unit configured to form an image expressed by the projection light reflected by the reflectors so that an occupant in a vehicle can see the image; and a casing housing at least the projector among the projector and the reflectors, at least one of the reflectors being disposed outside the casing, wherein the reflector disposed outside the casing is disposed at a roof near a windshield of the vehicle.

By the structure described above, the roof that is approximately at the highest position in the vehicle room is used as a reflection position; therefore, the optical path from the projector to the image formation unit can be set long and the virtual image can be disposed at a far position. As a result, the virtual image can be overlapped as appropriate on a real world that an occupant sees; thus, the occupant can recognize the information in the real world intuitively. In particular, since there is nothing to interrupt at the roof near the windshield, the roof near the windshield can be used as a part of the optical path. In addition, by using the roof as the reflection position, the number of reflection members used to extend the optical path can be reduced.

In the head-up display device according to the present invention, the casing may be provided inside a dashboard of the vehicle.

By the above structure, the optical path from the projector to the image formation unit includes the long optical path from the dashboard to the roof; therefore, the virtual image can be disposed at a farther position.

In the head-up display device according the present invention, the reflectors may include: a first reflector housed in the casing and configured to reflect the projection light emitted from the projector; a second reflector disposed outside the casing and configured to reflect the projection light reflected by the first reflector; and a third reflector housed in the casing and configured to reflect the projection light reflected by the second reflector, wherein the image formation unit is configured to reflect the projection light reflected by the third reflector toward the occupant in the vehicle so that the occupant can see the image.

By the above structure, the optical path length can be set long by extending the distance between the first reflector and the second reflector and the distance between the second reflector and the third reflector; thus, the virtual image can be disposed at a farther position. In addition, the position of the optical path can be changed by changing the positions of the reflectors; thus, the degree of freedom of the optical path can be increased.

In the head-up display device according the present invention, the first reflector and the second reflector may be convex mirrors configured to magnify the projection light in a width direction of the vehicle and the third reflector may be a concave mirror configured to magnify the projection light in a length direction and/or a height direction of the vehicle.

In the above structure, each reflector may be a mirror having a convex or concave shape in one direction (width direction, length direction, or height direction of the vehicle); thus, in this case, the manufacture thereof is easier than the manufacture of a mirror having convex or concave shapes in a plurality of directions.

The second reflector may be disposed at a front end of a front roof rail.

In the above structure, the second reflector is attached more easily.

According to the present invention, the optical path from the projector to the image formation unit can be set long and the virtual image can be disposed at a far position.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Preferred embodiments of a head-up display device according to the present invention will hereinafter be described in detail with reference to the attached drawings. In the description below, a length direction of a vehicle 10 includes a front-rear direction of the vehicle 10. A height direction includes an up-down direction. A width direction of the vehicle 10 includes a left-right direction.

[First Embodiment]

Figure 1:
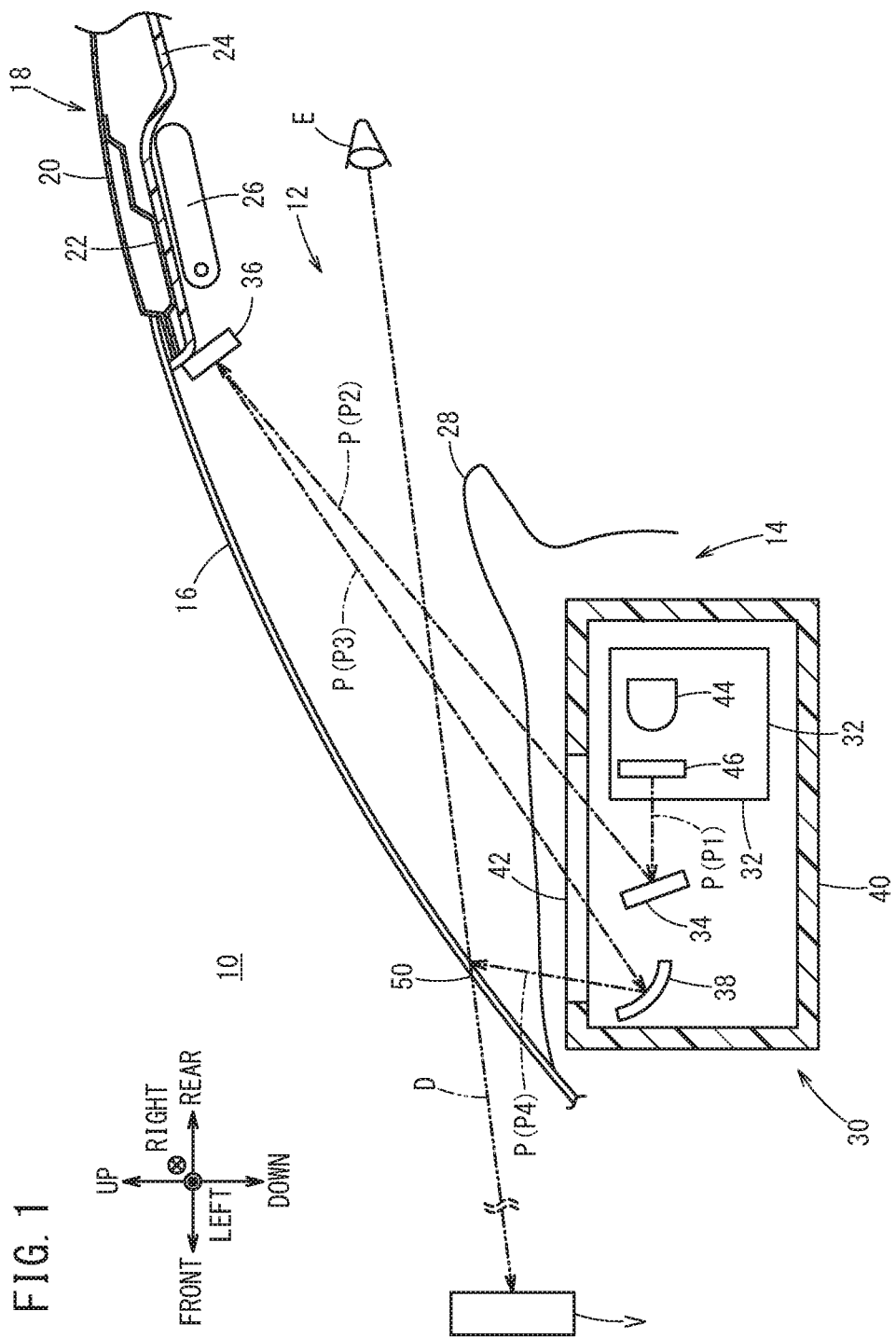
FIG. 1 is a schematic view illustrating a structure of a head-up display device according to one embodiment of the present invention.

As illustrated in FIG. 1, a windshield 16 is provided between a front part of a vehicle room 12 and the outside of the vehicle 10. An upper end part of the windshield 16 is connected to a roof 18. The roof 18 includes a roof panel 20 and a front roof rail 22 whose front ends are coupled to each other, and an interior member 24 positioned on the vehicle room 12 side of the roof 18. A front part of the interior member 24 is provided with a sun visor 26. On the other hand, a lower part of the windshield 16 faces a dashboard 28 in the vehicle room 12. In the vehicle room 12, a head-up display device 14 is provided near the windshield 16.

The head-up display device 14 includes an HUD unit 30 provided inside the dashboard 28, a second reflector 36 disposed at the roof 18 near the windshield 16, and an image formation unit 50 corresponding to a part of the windshield 16.

The HUD unit 30 is disposed in front of a driver's seat 90 (FIG. 2) and includes a projector 32, a first reflector 34, and a third reflector 38 housed in a casing 40 made of resin. The casing 40 is provided with a transparent window 42 through which light can pass from the inside to the outside or from the outside to the inside.

Figure 2:
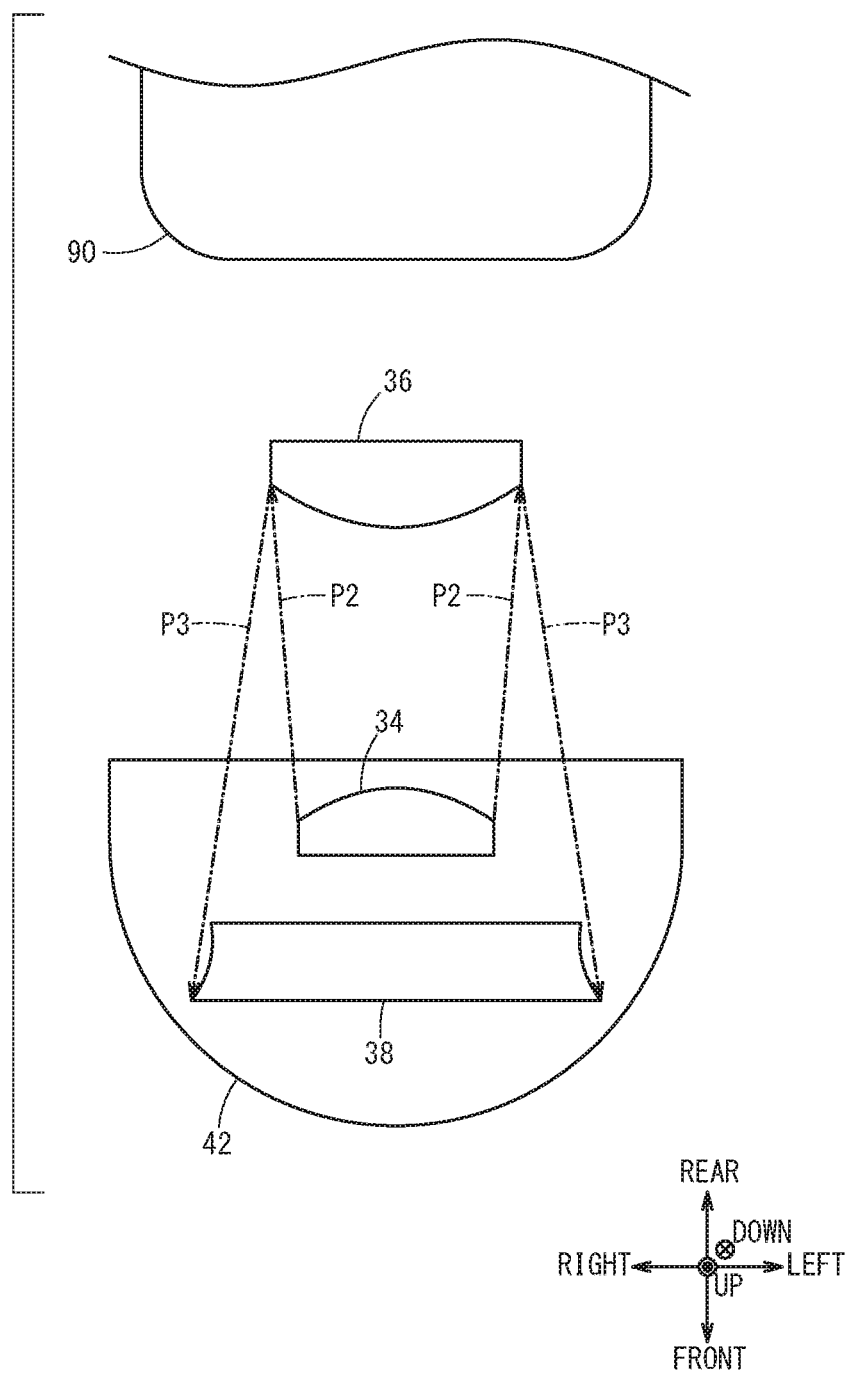
FIG. 2 is a schematic view illustrating an arrangement of reflectors seen from above a vehicle.

As illustrated in FIG. 1 and FIG. 2, in the present embodiment, projection light P (P1, P2, P3, P4) propagates from the projector 32 to the image formation unit 50, and an image is displayed on the image formation unit 50. Optical elements disposed on an optical path of the projection light P are described in order.

The projector 32 includes a display panel 46 to display the image, and a light source 44 that illuminates the display panel 46. The display panel 46 is, for example, a liquid crystal panel, and displays a screen in response to an order output from a control unit (not shown). The light source 44 is, for example, an LED or a projector. By illuminating the display panel 46 with the light source 44, the projection light P (P1) including the image displayed in the display panel 46 is emitted from the projector 32.

Figure 3A:
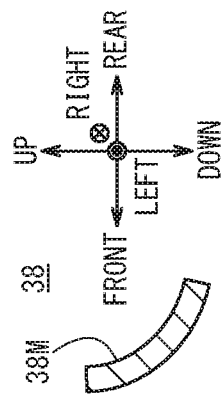
FIG. 3A is a cross-sectional view of a first reflector along one direction.
Figure 3C:
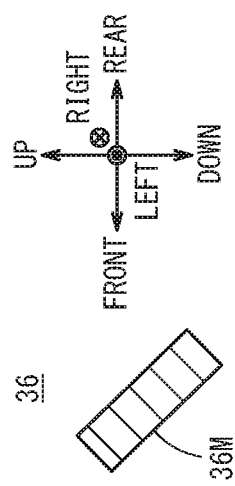
FIG. 3C is a cross-sectional view of a second reflector along one direction.
Figure 3E:
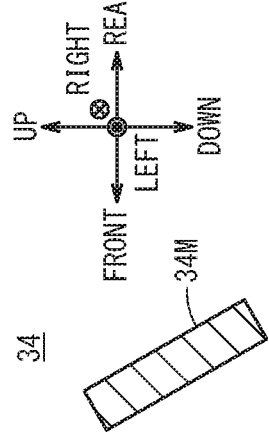
FIG. 3E is a cross-sectional view of a third reflector along one direction.
Figure 3B:
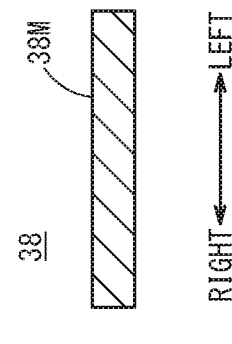
FIG. 3B is a cross-sectional view of the first reflector along another direction.

The first reflector 34 is disposed on the optical path of the projection light P (P1) emitted from the projector 32. The first reflector 34 is a convex mirror that magnifies and reflects the incident projection light P (P1) in the width direction of the vehicle 10. As illustrated in FIG. 3A, when a cross-sectional shape of the first reflector 34 taken along a plane parallel to the length direction and the height direction of the vehicle 10 is assumed, a mirror part 34M of the cross-sectional shape is linear. In addition, as illustrated in FIG. 3B, when a cross-sectional shape of the first reflector 34 taken along a plane parallel to the width direction of the vehicle 10 is assumed, the mirror part 34M of the cross-sectional shape is convex.

Figure 3D:
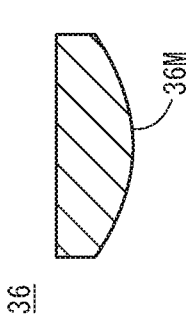
FIG. 3D is a cross-sectional view of the second reflector along another direction.

The second reflector 36 is disposed outside the casing 40, and is disposed on the optical path of the projection light P (P2) reflected by the first reflector 34. In the present embodiment, the second reflector 36 is disposed at the front roof rail 22, more specifically, at a front end of the front roof rail 22. The second reflector 36 is a convex mirror that magnifies and reflects the incident projection light P (P2) in the width direction of the vehicle 10. As illustrated in FIG. 3C, when a cross-sectional shape of the second reflector 36 taken along a plane parallel to the length direction and the height direction of the vehicle 10 is assumed, a mirror part 36M of the cross-sectional shape is linear. In addition, as illustrated in FIG. 3D, when a cross-sectional shape of the second reflector 36 taken along a plane parallel to the width direction of the vehicle 10 is assumed, the mirror part 36M of the cross-sectional shape is convex.

Figure 3F:
FIG. 3F is a cross-sectional view of the third reflector along another direction.

The third reflector 38 is disposed on the optical path of the projection light P (P3) reflected by the second reflector 36. The third reflector 38 is a concave mirror that magnifies and reflects the incident projection light P (P3) in the length direction and/or the height direction of the vehicle 10. As illustrated in FIG. 3E, when a cross-sectional shape of the third reflector 38 taken along a plane parallel to the length direction and the height direction of the vehicle 10 is assumed, a mirror part 38M of the cross-sectional shape is concave. In addition, as illustrated in FIG. 3F, when a cross-sectional shape of the third reflector 38 taken along a plane parallel to the width direction of the vehicle 10 is assumed, the mirror part 38M of the cross-sectional shape is linear.

The image formation unit 50 is the windshield 16 that is disposed on the optical path of the projection light P (P4) reflected by the third reflector 38, and forms the image included in the incident projection light P (P4) so that an occupant in the vehicle 10 can see the image.

In the head-up display device 14, the projection light P (P1) emitted from the projector 32 is reflected to a direction of the roof 18 by the first reflector 34, transmits through the window 42, and propagates to the outside of the casing 40. After that, the projection light P (P2) is reflected to a direction of the HUD unit 30 by the second reflector 36, transmits through the window 42, and propagates to the inside of the casing 40 again. After that, the projection light P (P3) is reflected by the third reflector 38, transmits through the window 42, and reaches the image formation unit 50. When the image included in the projection light P (P4) is formed on the image formation unit 50, the eyes E of the driver recognize a virtual image V at a far position in accordance with the length of the optical path.

The distance to the virtual image V that is recognized by the eyes E of the driver, that is, a display distance D of the virtual image V is expressed by the following formula (1):

$$\text{Display distance } D = L + mS \tag{1}$$

L: the distance from the eyes E to the image formation unit 50 + the optical path length from the third reflector 38 to the image formation unit 50 m: the magnification ratio of the third reflector 38

S: the optical path length from the display panel 46 to the third reflector 38

In the head-up display device 14 according to the present embodiment, the optical path length of the projection light P2 that propagates from the first reflector 34 to the second reflector 36 and the optical path length of the projection light P3 that propagates from the second reflector 36 to the third reflector 38 are approximately equal to the length of the windshield 16 in a longitudinal direction. Therefore, in the formula (1), the length S becomes very long and thus, the display distance D can be extended without increasing the magnification ratio m. As a result, the virtual image V can be disposed at a far position.

[Other Embodiments]

Figure 4:
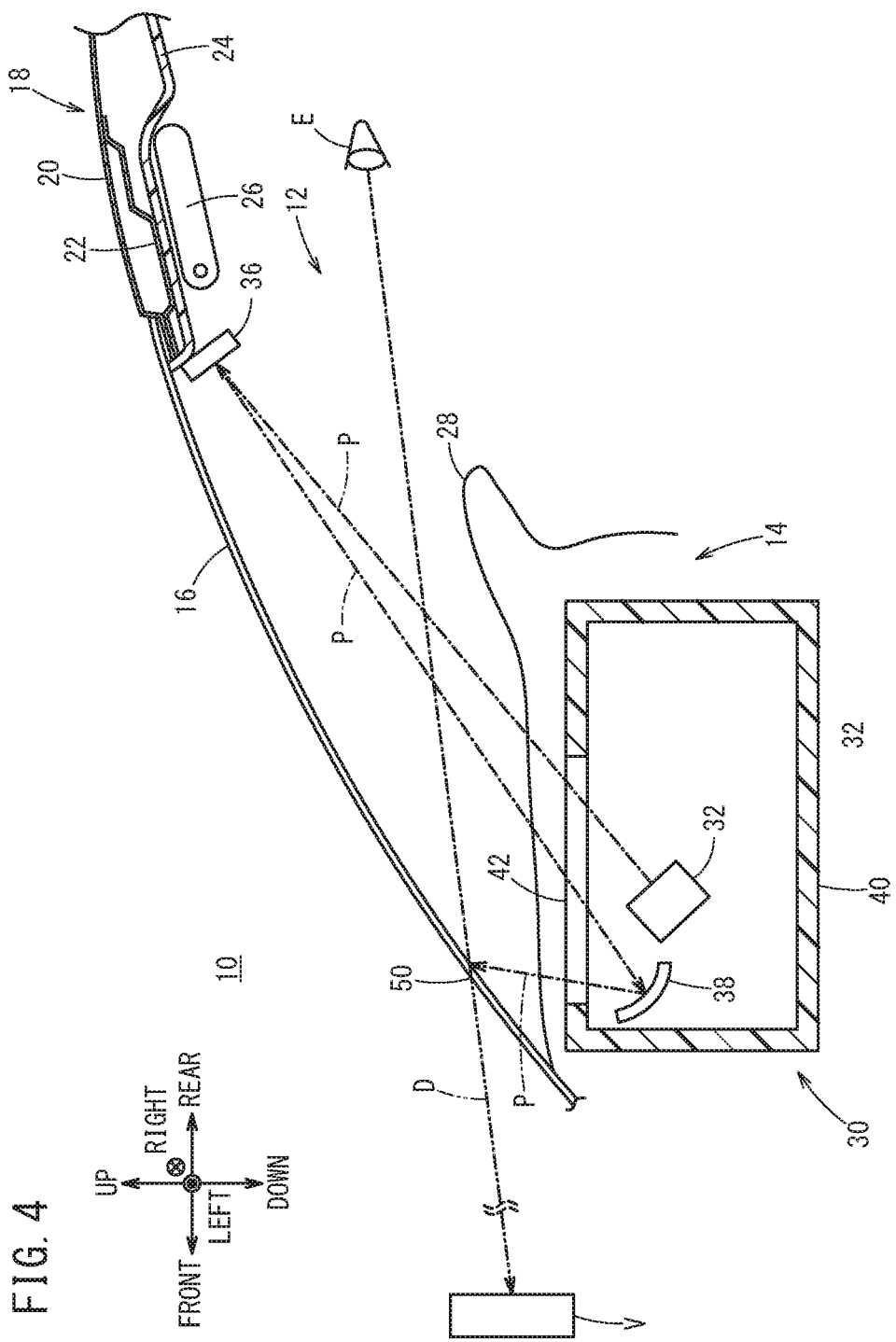
FIG. 4 is a schematic view illustrating a structure of a head-up display device according to another embodiment of the present invention.

The first reflector 34 used in the first embodiment may be omitted. That is to say, as illustrated in FIG. 4, the projection light P can be directly emitted from the projector 32 to the second reflector 36.

In addition to the first reflector 34, the second reflector 36, and the third reflector 38, another reflector may be provided and another optical element (such as a lens) may be provided on the optical path. As the projector 32, a reflective liquid crystal panel may be used.

It is only necessary that the second reflector 36 is disposed near a border between the roof 18 and the windshield 16. For example, the second reflector 36 may be provided to the windshield 16 near the roof 18. The HUD unit 30 may be disposed in front of the seat next to the driver's seat.

[Summary of Embodiments]

The head-up display device 14 according to the present embodiment includes: the projector 32 configured to emit the projection light P including image information; the plurality of reflectors (first reflector 34, second reflector 36, and third reflector 38) configured to reflect the projection light P emitted from the projector 32 in a predetermined direction; the image formation unit 50 configured to form the image expressed by the projection light P reflected by the reflectors so that the occupant in the vehicle 10 can see the image; and the casing 40 housing at least the projector 32 among the projector 32 and the reflectors. At least one of the reflectors (second reflector 36) is disposed outside the casing 40. The second reflector 36 disposed outside the casing 40 is disposed at the roof 18 near the windshield 16 of the vehicle 10.

By the structure described above, the roof 18 that is approximately at the highest position in the vehicle room 12 is used as a reflection position; therefore, the optical path from the projector 32 to the image formation unit 50 can be set long and the virtual image V can be disposed at a far position. As a result, the virtual image V can be overlapped as appropriate on a real world that the occupant sees; thus, the occupant can recognize the information in the real world intuitively. In particular, since there is nothing to interrupt at the roof 18 near the windshield 16, the roof 18 near the windshield 16 can be used as a part of the optical path. In addition, by using the roof 18 as the reflection position, the number of reflection members used to extend the optical path can be reduced.

The casing 40 is provided inside the dashboard 28 of the vehicle 10. By the above structure, the optical path from the projector 32 to the image formation unit 50 includes the long optical path from the dashboard 28 to the roof 18; thus, the virtual image V can be disposed at a farther position.

The reflectors include: the first reflector 34 housed in the casing 40 and configured to reflect the projection light P1 emitted from the projector 32; the second reflector 36 disposed outside the casing 40 and configured to reflect the projection light P2 reflected by the first reflector 34; and the third reflector 38 housed in the casing 40 and configured to reflect the projection light P3 reflected by the second reflector 36. The image formation unit 50 is configured to reflect the projection light P4 reflected by the third reflector 38 toward the occupant in the vehicle 10 so that the occupant can see the image. By the above structure, the optical path length can be set long by extending the distance between the first reflector 34 and the second reflector 36 and the distance between the second reflector 36 and the third reflector 38; thus, the virtual image V can be disposed at the farther position. In addition, the position of the optical path can be changed by changing the positions of the reflectors; thus, the degree of freedom of the optical path can be increased.

The first reflector 34 and the second reflector 36 are convex mirrors configured to magnify the projection light P in the width direction of the vehicle 10. The third reflector 38 is a concave mirror configured to magnify the projection light P in the length direction and/or the height direction of the vehicle 10. In the above structure, each reflector may be a mirror having a convex or concave shape in one direction (width direction, length direction, or height direction of vehicle 10); thus, in this case, the manufacture thereof is easier than the manufacture of a mirror having convex or concave shapes in a plurality of directions.

The second reflector 36 may be disposed at the front end of the front roof rail 22. In the above structure, the second reflector 36 is attached more easily.

The head-up display device 14 according to the present invention is not limited to the embodiments described above, and various structures can be employed without departing from the gist of the present invention.

What is claimed is:

1. A head-up display device comprising:
    a projector configured to emit projection light including image information;
    a plurality of reflectors configured to reflect the projection light emitted from the projector in a predetermined direction;
    an image formation unit configured to form an image expressed by the projection light reflected by the reflectors so that an occupant in a vehicle can see the image; and
    a casing at least the projector among the projector and the reflectors, at least one of the reflectors being disposed outside the casing,
    wherein the reflector disposed outside the casing is disposed at a roof near a windshield of the vehicle,
    the reflectors comprising:
        a first reflector housed in the casing and configured to reflect the projection light emitted from the projector;
        a second reflector disposed outside the casing and configured to reflect the projection light reflected by the first reflector; and
        a third reflector housed in the casing and configured to reflect the projection light reflected by the second reflector,
    wherein the image formation unit is configured to reflect the projection light reflected by the third reflector toward the occupant in the vehicle so that the occupant can see the image.

2. The head-up display device according to claim 1, wherein the casing is provided inside a dashboard of the vehicle.

3. The head-up display device according to claim 1, wherein the first reflector and the second reflector are mirrors configured to magnify the projection light in a width direction of the vehicle, and the third reflector is another mirror configured to magnify the projection light in a length direction and/or a height direction of the vehicle.

4. The head-up display device according to claim 1, wherein the second reflector is disposed at a front end of a front roof rail.

\* \* \* \* \*